United States Patent [19]
Friedl et al.

[11] 3,828,264
[45] Aug. 6, 1974

[54] DEVICE FOR OPTICAL AMPLIFICATION OF A COHERENT SIGNAL

[75] Inventors: Wolfgang Friedl, Neckargemund; Claus Aberle, Manheim, both of Germany

[73] Assignee: Eltro GmbH & Co., Heidelberg, Germany

[22] Filed: Dec. 29, 1974

[21] Appl. No.: 319,856

[30] Foreign Application Priority Data
Dec. 29, 1971 Germany.......................... 2165270

[52] U.S. Cl. ............ 330/4.3, 350/96 B, 331/94.5 C
[51] Int. Cl................................................ H01s 1/02
[58] Field of Search ...... 330/4.3; 350/162 SF, 96 B; 331/94.5 C, 94.5 M

[56] References Cited
UNITED STATES PATENTS
2,929,922  3/1960  Schawlow et al. ............ 331/94.5 M
3,273,072  9/1966  Korster et al. ...................... 330/4.3
3,729,252  4/1973  Nelson ................................ 350/96 B OTHER PUBLICATIONS
Kapary, "Lasers and Fiber Optics," 7/67, pp. 59–65, Laser Focus.
Kapary, "Lasers and Fiber Optics," 7/67, pp. 20–26, Laser Focus, Vol. 3, No. 13.

*Primary Examiner*—Maynard R. Wilbur
*Assistant Examiner*—N. Moskowitz
*Attorney, Agent, or Firm*—Eric H. Waters

[57] ABSTRACT

A device for optical amplification of a coherent signal comprising a laser composed of a bundle of fibres which are individually pumped simultaneously. The fibres are constituted as gradient fibres. An objective is located behind the bundle and a frequency filter is secured to the bundle and mounted at the Fourier plane of the objective. An auto-collimator may be provided for the amplified coherent light beams.

5 Claims, 2 Drawing Figures

DEVICE FOR OPTICAL AMPLIFICATION OF A COHERENT SIGNAL

BACKGROUND

1. Field of the Invention

The present invention relates to a device for optical amplification of a coherent signal with a laser composed of a fibre bunch whose individual fibres are simultaneously optically pumped.

2. Prior Art

There are known devices which utilize a laser for the optical amplification, or for the production of a coherent light beam, whose active part consists of a single fibre which is optically pumped. Such a device is disclosed, for instance, in U.S. Pat. No. 3,395,366, in which the fibre widens conically at its ends, and which is surrounded by an enclosure made of transparent material. The source of the pumping light is arranged helically around the fibre.

In such a device, the spontaneous emissions which are being amplified to a super emission constitute a source of interference, which contributes to an increase of the energy level necessary for the signal amplification.

There is also known a device, in which the laser does not consist of only a single fibre, but of a bunch of fibres which are simultaneously pumped from a light source which is arranged parallel to the fibres. Such a laser is disclosed in U.S. Pat. No. 3,471,215. When compared with a laser having only a single laser rod, this arrangement has the advantage that the cooling of the active material can be achieved in a much simpler manner, since the cooling medium can flow between the individual fibres of the bunch. Furthermore, the effectiveness of the optical pumping can be increased by an advantageous geometry, achieved as a result of the flexibility of the fibre bunch.

However, a fibre bunch does not deliver coherent light beams without resorting to special constructional measures.

SUMMARY OF THE INVENTION

It is an object of the present invention to provide a simplified and highly effective device of the abovementioned kind which permits the amplification of a coherent signal.

It is another object of the present invention to reduce the interference caused by the spontaneous emissions, and the reduction of the associated energy level resulting from the same.

According to the invention, these objectives are achieved in that the fibre bunch is composed of a plurality of gradient fibres, and that a frequency filter is secured to the structure of the fibre bunch and is provided in the Fourier plane of an objective located behind the fibre bunch.

In the case in which the signal to be amplified is coherent at the time of its entry into the fibre bunch, the same is true for the signal emitted from the fibre bunch after being amplified, since in a gradient fibre, i.e., in a fibre whose refraction index has a gradient, when the length of the fibres is constant, the length of the optical path $n(r)ds$ is also constant ($n$ = index of refraction, $r$ = perpendicular distance from the optical axis, $s$ = optical path).

The frequency filter which is arranged behind the fibre bunch has the effect that such waves are preferably amplified in the individual fibres, which are characterized by the same phases at the input and at the output of the fibre bunch. For this case of phase coincidence, there is obtained in the Fourier plane of the objective arranged behind the fibre bunch, at which the frequency filter is arranged, an interference phenomenon corresponding to the structure of the fibre bunch, which renders possible filtering of the coherent waves and attenuation of the incoherent light emissions by means of the frequency filter. Consequently, while the incoherent light emissions (i.e., the amplified spontaneous emissions of the individual fibres) can pass through the location frequency filter only partially, the amplified coherent light beams carrying the signal passes through the filter meeting virtually no resistance.

The amplification of the signal can be increased even more, by passing the coherent light beam through the fibre bunch several times. In order to achieve this, the device according to the invention may be provided with, for instance, an auto-collimation device consisting of two mirrors, wherein one of the mirrors simultaneously serves the purpose of decoupling or beam-splitting the amplified light beam, and, consequently, is constructed as a semi-transparent mirror.

A shorter fibre bunch, which is passed by a signal several times as a result of the auto-collimation, is advantageous in comparison with a longer fibre bunch, through which the light beam to be amplified passes only once, in that the interference light which has been amplified after the first passage is attenuated by means of the frequency filter, prior to its being amplified again during the second passage in the same manner and to the same degree as the coherent light beam. In this manner, the energy level necessary for the amplification of the coherent light beam because of the amplified spontaneous emissions is reduced, so that a larger part of the pumping input is available for the amplification of the actual signal.

Advantageously, the end surfaces at the input and the output of the fibre bunch are not made plane, but curved, in order to be able to avoid the need for further image-forming elements. If this consideration is not important, it is advantageous to provide a field lens at the input and the output of the fibre bunch such that the image of one field lens is formed on one auto-collimation mirror and the image of the other field lens is formed on the other auto-collimation mirror by means of an objective arranged behind the fibre bunch.

In a further advantageous embodiment of the invention, a transparent phase grating is arranged in front of the input of the fibre bunch, (if a field lens is provided, in the entrance opening) which phase grating has the purpose of transmitting the light flow, entrapped by the entrance opening of the device, without any substantial losses to the fibres of the bunch. Such a phase grating constitutes a two-dimensional periodic phase structure, by which the coherent signal to be amplified can be modified, and in such manner the intensity of the signal light beam is increased by interference at the input ends of the individual fibres, while the same is decreased between the fibres.

In order to obtain sufficient intensity of the light beams also for the higher harmonic interference waves, the phase structure of the grating is preferably constructed such that the recesses are small when compared with the grating constants. As a result of this, an interference effect is created by the output of the fibre bunch in the focal plane of the field lens which is positioned behind the fibre bunch, the interference effect being characterized by sharp maxima of the intensity, whose mutual distances are large when compared with the spread of the maxima. Herein, the distances of the maxima are associated with the grating constants of the phase grating, and their spreads are associated with the dimensions of the grating recesses or grooves.

The light beam intensity is suppressed beyond the interference maxima by means of the location frequency filter which is constructed so as to correspond to the interference phenomenon created by the output of the fibre bunch, so that a large portion of the superposed light beams (interference beams), which are triggered in the fibre bunch by spontaneous emissions and which are mutually incoherent, is filtered out. Since these light beams are continuously spread over the level of the frequency filter, then only that relatively small portion of the superposed light beams which falls in the regions of the interference maxima can pass through the filter.

A special possibility for the utilization of the device according to the invention results, when an objective is arranged outside the semi-transparent auto-collimation mirror, which serves the purpose of decoupling or separating the amplified coherent signal, which objective collimates the decoupled light beams. If such is the case, the entire system represents a Kepler laser-telescope, in which the divergence of the decoupled coherent light beams is determined by the diameter of the outlet opening.

It is well known in the art to effect the optical transmission and amplification, of images by means of individual gradient fibres or fibre bunches, wherein only an assorted fibre bunch having a homogeneous index of refraction can be utilized. Corresponding devices and methods are disclosed, for instance, in the following publications:

1. "Applied Optics and Optical Engineering" by Rudolf Kingslake, 1967, vol. IV, pages 2 to 23,
2. "Fibre-Optics, Principles and Applications" by N. S. Kapany, 1967, pages 200-201,
3. "Technische Rundschau," No. 32, July 27, 1962, pages 2-5.

The production of such fibre bunches is rather complicated and, consequently, expensive. However, such complications can be avoided when the device according to the present invention is used for optical amplification of the images, which device makes possible to substitute the arranged or assorted fibre bunch which has been used up to the present time by an unarranged fibre bunch. Herein, the fibre bunch is reflected at its end, i.e., it represents an auto-collimation bunch. The image which is present at the input of the bunch and which is to be amplified, reaches the input again with correspondingly higher light beam intensity, after being auto-collimated at the output of the bunch, and can be decoupled by conventional means (for instance, a semi-transparent plate). It is substantially less expensive to manufacture such a device than the devices which have been used for optical amplification of images up to the present time.

BRIEF DESCRIPTION OF THE DRAWING

In the drawing, there are shown two embodiments according to the invention in diagrammatic representation, wherein.

DETAILED DESCRIPTION

Figure 1:
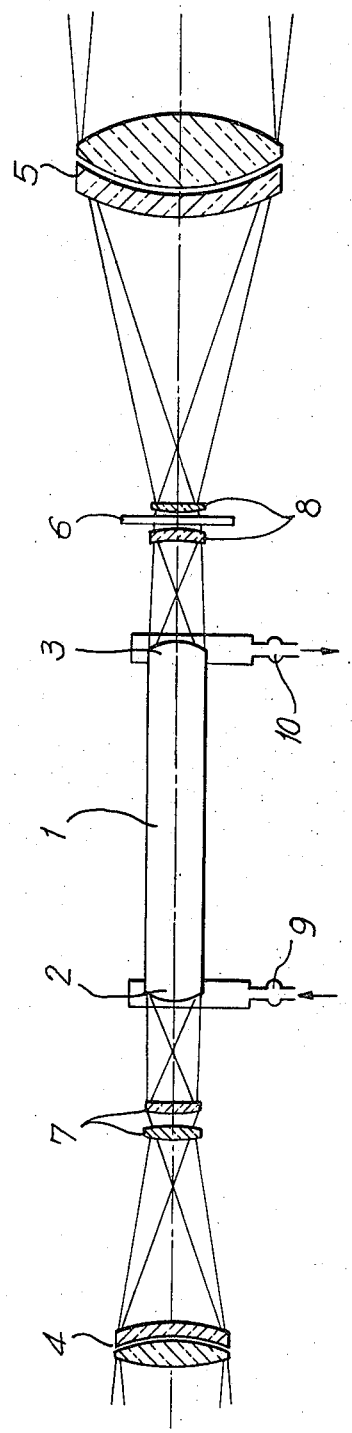
FIG. 1 is a device for optical amplification without auto-collimation.

FIG. 1 shows a laser consisting of a bundle or bunch of gradient fibres 1, which serve the purpose of amplification of a coherent signal. Both the input surface 2 and the output surface 3 of the fibre bundle 1 are curved. An input objective 4 is arranged in front of the input surface 2 of the fibre bundle such that the inlet opening of the device is on the surface 2. Behind the exit of the fibre bundle there is arranged an output objective 5. The focal plane of the latter coincides with its Fourier plane and precisely in this plane there is positioned a spatial frequency filter 6 whose structure (period) is adapted to the structure of the diffraction phenomenon of the fibre bundle 1. Optical systems 7 and 8 both consisting of two lens elements have the function of field lenses, i.e., the optical system 7 forms an image at the exit of lens 4 at the entrance surface 2 and the optical system 8 has the same function concerning the exit surface 3 and the entrance of objective lens 5. The lenses of optical system 8 are on opposite sides of filter 6. The entire gradient fibre bundle 1 is embedded in a cooling system, only the supply and discharge conduits 9 and 10 of which are illustrated. Instead of the cooling medium, or simultaneously therewith, an ionizable gas may be introduced into the cooling system in order to produce the pumping energy.

Now, when a coherent signal which is to be amplified is introduced into the gradient fibre bundle 1 via the input objective 4 and the lens system 7, only those waves of the individual fibers are amplified which have the same phases at the input surface 2 as at the output surface 3. In this case, an interference phenomenon occurs in the Fourier level at which the frequency filter 6 is located, the interference phenomenon being determined by the structure of the fibre bunch 1. The coherent waves can then be filtered out by means of the frequency filter 6, i.e., they pass unhindered through the frequency filter 6, whereas the incoherent waves are attenuated.

Figure 2:
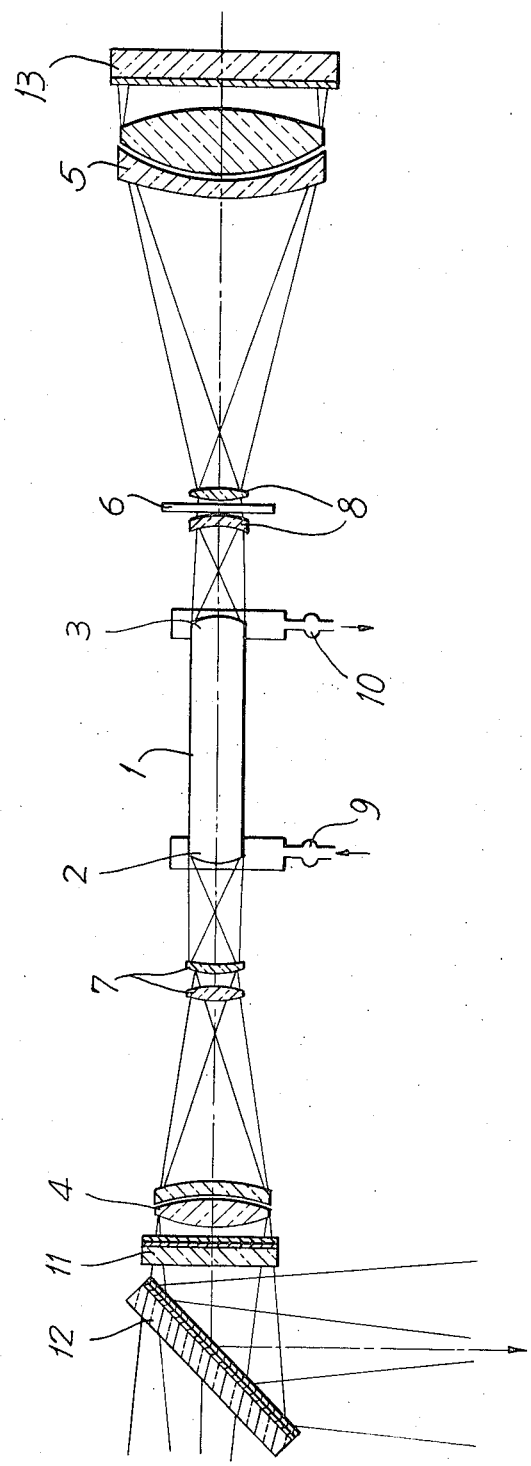
FIG. 2 is a device with auto-collimation.

In FIG. 2, there is shown a device according to the invention, in which the degree of amplification can be increased even more significantly for the coherent light beams by an auto-collimation process. The same structural elements as illustrated in FIG. 1 are designated by the same reference numerals. A semi-transparent plane mirror 11 is arranged in front of the input objective 4, the mirror being at right angles with the optical axis of the device. A further semi-transparent mirror 12 is at an angle of 45° with the optical axis and serves the purpose of decoupling or separating the amplified coherent signal as schematically shown by the arrow. The input of the light beams to be amplified into the device is also effected through the mirror 12. A second plane mirror 13 is arranged perpendicular to the optical axis and has an almost 100 percent reflective capability, the mirror 13 being positioned behind the output objective 5. The coherent waves which have already been amplified during their passage through the fibre bunch 1 and the frequency filter 6 are reflected by mirror 13 and re-enter the fibre bunch, where they are amplified once more. This procudure is repeated several times, utilizing the mirror 13, and the two mirrors 11 and 12 to effect an auto-collimation of the coherent waves.

What is claimed is:

1. A device for optical amplification of a coherent signal comprising a laser structure including a fibre bunch having input and output surfaces which are curved, the individual fibres of the bunch being pumped simultaneously, said fibres of the fibre bunch being composed as a plurality of unarranged gradient fibres serving for signal amplification and image amplification, an objective located behind the fibre bunch, a frequency filter secured to said bunch and mounted at the Fourier plane of said objective, and means for auto-collimation of the amplified coherent light beams and for separating the output light beam.

2. A device according to claim 1 comprising two fields lens systems, one arranged to face the input of said bunch, the other one to face the output of said bunch such that one of the field lens systems is focussed on the auto-collimation means by means of said objective.

3. A device according to claim 1 comprising transparent phase grating means arranged between the objective and the fibre bunch for increasing the light beam intensity at the inputs of the individual fibres by attenuating incoherent waves.

4. A device according to claim 3 wherein said grating means has a phase structure with recesses or grooves which are small in comparison to the phase grating constants.

5. A device according to claim 1 wherein the auto-collimation means comprises a mirror which is semi-transparent, and an objective for collimation of the separated light beams located behind the semi-transparent mirror.

* * * * *